(12) United States Patent
Hoshiba et al.

(10) Patent No.: US 12,377,689 B2
(45) Date of Patent: Aug. 5, 2025

(54) PNEUMATIC TIRE

(71) Applicant: The Yokohama Rubber Co., LTD., Tokyo (JP)

(72) Inventors: Takashi Hoshiba, Hiratsuka (JP); Mizuki Kuninaka, Hiratsuka (JP); Noriyoshi Koyama, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 518 days.

(21) Appl. No.: 16/965,982

(22) PCT Filed: Jan. 15, 2019

(86) PCT No.: PCT/JP2019/000854
§ 371 (c)(1),
(2) Date: Jul. 29, 2020

(87) PCT Pub. No.: WO2019/150929
PCT Pub. Date: Aug. 8, 2019

(65) Prior Publication Data
US 2021/0039448 A1    Feb. 11, 2021

(30) Foreign Application Priority Data
Jan. 30, 2018  (JP) ................................. 2018-013588

(51) Int. Cl.
*B60C 13/00*        (2006.01)
(52) U.S. Cl.
CPC ................................. *B60C 13/001* (2013.01)
(58) Field of Classification Search
CPC ........ B60C 13/00; B60C 13/001; B60C 13/02
See application file for complete search history.

(56) References Cited

U.S. PATENT DOCUMENTS

| | | | | |
|---|---|---|---|---|
| 4,343,342 A | * | 8/1982 | McDonald | B60C 13/001 |
| | | | | D12/605 |
| 4,823,856 A | * | 4/1989 | Roberts | B60C 13/001 |
| | | | | 152/523 |

(Continued)

FOREIGN PATENT DOCUMENTS

| | | | | |
|---|---|---|---|---|
| DE | 202017103420 U1 | * | 8/2017 | B23K 26/032 |
| JP | S58-180706 U | * | 12/1983 | |

(Continued)

OTHER PUBLICATIONS

Point for Determining the Code Area. [online]. Denso Wave, Inc. Aug. 6, 2017. [retrieved on Nov. 4, 2022]. Retrieved from the Internet: <URL: https://web.archive.org/web/20170806111019/https://www.qrcode.com/en/howto/code.html>. (Year: 2017).*

(Continued)

*Primary Examiner* — Robert C Dye
(74) *Attorney, Agent, or Firm* — Thorpe North & Western

(57) ABSTRACT

A surface of a sidewall portion of a pneumatic tire includes: a ridge pattern region provided with a plurality of ridges extending continuously in one direction at an interval, a smooth surface region composed of a smooth surface, and a two-dimensional code having a rectangular shape in which a dot pattern is formed of two kinds of gray scale elements that are formed distinguishable from each other by unevenness of a surface. The two-dimensional code is provided in the smooth surface region, and a shortest distance Lmin at a position where a distance from the ridge pattern region to the two-dimensional code is the shortest distance Lmin among four sides of the rectangular shape of the two-dimensional code is from 3 to 25% of a length W of one side, of the two-dimensional code, the one side having the position where the distance of the two-dimensional code is the shortest distance Lmin.

13 Claims, 5 Drawing Sheets

(56) References Cited

U.S. PATENT DOCUMENTS

| | | | |
|---|---|---|---|
| 6,391,134 B1 | 5/2002 | Lipovac | |
| 2002/0174928 A1* | 11/2002 | Ratliff, Jr. | B60C 13/001 |
| | | | 152/555 |
| 2003/0084979 A1* | 5/2003 | Matsumoto | B60C 13/001 |
| | | | 152/523 |
| 2004/0003881 A1* | 1/2004 | Ebiko | B60C 13/001 |
| | | | 152/523 |
| 2006/0151451 A1 | 7/2006 | Smith, Jr. et al. | |
| 2016/0239734 A1 | 8/2016 | Metz et al. | |
| 2017/0011666 A1* | 1/2017 | Kraus | G09F 3/0297 |
| 2017/0050473 A1 | 2/2017 | Muhlhoff et al. | |
| 2017/0213117 A1* | 7/2017 | Kraus | B60C 13/001 |
| 2018/0354315 A1* | 12/2018 | Itoi | B60C 13/001 |
| 2019/0135011 A1* | 5/2019 | Duchene | B41M 5/0082 |
| 2020/0070592 A1 | 3/2020 | Hatano | |

FOREIGN PATENT DOCUMENTS

| | | | | |
|---|---|---|---|---|
| JP | H07-266811 | | 10/1995 | |
| JP | 2005-164655 | | 6/2005 | |
| JP | 2017-516698 | | 6/2017 | |
| JP | 6465192 | | 2/2019 | |
| WO | WO-0013922 A1 | * | 3/2000 | ........... B60C 13/001 |
| WO | WO 2005/000714 | | 1/2005 | |
| WO | WO 2015/058874 | | 4/2015 | |
| WO | WO 2015/165863 | | 11/2015 | |
| WO | WO-2015165863 A1 | * | 11/2015 | ........... B60C 13/001 |
| WO | WO 2017/174920 | | 10/2017 | |
| WO | WO 2018/180497 | | 10/2018 | |
| WO | WO 2019/098275 | | 5/2019 | |

OTHER PUBLICATIONS

English machine translation of JPS58-180706U. (Year: 1983).*
Do's and Don'ts of QR Codes. [online] QR-Codes.com. Sep. 1, 2012. [retrieved on Jun. 16, 2023]. Retrieved from the Internet: <URL: https://web.archive.org/web/20120901193410/https://qr-codes.com/dos-and-donts-of-qr-codes>. (Year: 2012).*
English machine translation of DE-202017103420-U1. (Year: 2017).*
English machine translation of WO2015/165863 (Year: 2015).*
International Search Report for International Application No. PCT/JP2019/000854 dated Apr. 16, 2019, 4 pages, Japan.

* cited by examiner

PNEUMATIC TIRE

TECHNICAL FIELD

The present technology relates to a pneumatic tire and more specifically to a pneumatic tire having a two-dimensional code engraved on a sidewall portion of the tire.

BACKGROUND ART

In the related art, a known pneumatic tire (hereinafter referred to simply as a tire) is provided with, in a sidewall portion, a two-dimensional code in which information is recorded. Since the two-dimensional code can contain more information than the one-dimensional code, the tire can be managed by incorporating various information in the two-dimensional code. In particular, in the related art, a sidewall portion of a tire is provided with a two-dimensional code which has a pattern composed of a gray scale element by engraving a predetermined dot hole pattern on the sidewall portion of the tire (International Patent Publication No. WO 2005/000714).

Since the two-dimensional code formed by engraving a pattern of a predetermined dot hole on a tire side surface portion does not disappear unless the sidewall portion of the tire is worn, the tire can be effectively managed.

In many recent tires, a ridge pattern region is formed by using a plurality of ridges in the sidewall portion for improving the visibility of the tire. When the two-dimensional code is engraved on the sidewall portion of such a tire, if the two-dimensional code is engraved on the ridge pattern region, the gray scale elements of the two-dimensional code and the gray scale elements of the ridge pattern region overlap each other, so the readability of the two-dimensional code may be lowered. "The readability of the two-dimensional code" refers to the reading out of the two-dimensional code by a two-dimensional code reader, for example, a portable terminal, and "the lowering of readability" refers to a case where the reading out fails often.

When a two-dimensional code is engraved on a smooth surface region having a smooth surface without ridges on a sidewall portion, since the dark elements among the gray scale elements of the two-dimensional code can be sufficiently identified with respect to the light elements in the smooth surface region, the initial readability of the two-dimensional code is improved as compared with the case of engraving the two-dimensional code on a ridge pattern region. However, by providing a smooth surface region which is sufficiently wide for engraving the two-dimensional code together with the ridge pattern region, the ridge pattern region provided for improving the visibility of the tire becomes narrow, the visibility effect of the tire is lowered, and further the vulcanization failure occurring during the vulcanization of the tire easily occurs. "Vulcanization failure" occurs in a portion where the vulcanization of a green tire is insufficient because, when the green tire is expanded and pressed against a side forming surface of a tire mold during the vulcanization of the tire and the discharge of gas between the tire mold and the green tire cannot be sufficient, if the gas is confined in a gap between the tire mold and the green tire, the gas inhibits contact between the side forming surface of the tire mold controlled at a high temperature and the green tire. Since a large number of streak-like minute grooves corresponding to the ridges are formed in the side forming surface of the tire mold corresponding to the ridge pattern region, the minute grooves function as a passage for releasing the gas between the tire mold and the green tire during the vulcanization of the tire, so vulcanization failure hardly occurs. On the other hand, since the streak-like minute grooves corresponding to the ridges are not formed in the side forming surface of the tire mold corresponding to the smooth surface region, a vulcanization failure easily occurs. In view of the durability of the tire, it is not preferable to provide the two-dimensional code by engraving the dot hole in the smooth surface region where the vulcanization failure easily occurs.

When a two-dimensional code is engraved on a portion of the smooth surface region where a vulcanization failure exists, the surface unevenness of the two-dimensional code is changed by a crack generated around a dot hole of the two-dimensional code due to long-term use of the tire, and the readability of the two-dimensional code is easily lowered.

SUMMARY

When the two-dimensional code is engraved on the sidewall portion, it is desirable to provide a tire in which the initial readability is improved compared with the two-dimensional code engraved on the ridge pattern region, and the lowering of the readability of the two-dimensional code can be suppressed even when the tire is used long-term.

The present technology provides a tire in which the initial readability is improved compared with the two-dimensional code engraved on the ridge pattern region, and the lowering of the readability of the two-dimensional code can be suppressed even when the tire is used long-term.

One aspect of the present technology is a pneumatic tire including a pair of sidewall portions sandwich a tread portion is sandwiched from both sides in a tire width direction, the tread portion extending in a tire circumferential direction and forming an annular shape, on a surface of the sidewall portion, at least one of the pneumatic tire including: a ridge pattern region provided with a plurality of ridges extending continuously in one direction at an interval, a smooth surface region adjoining the ridge pattern region and having no ridge and composed of a smooth surface, and a two-dimensional code having a rectangular shape in which a dot pattern is formed of two kinds of gray scale elements that are formed distinguishable from each other by unevenness of a surface.

The two-dimensional code is provided in the smooth surface region, and a shortest distance Lmin at a position where the two-dimensional code has a distance from the ridge pattern region shortened to the shortest distance Lmin among four sides of the rectangular shape of the two-dimensional code is from 3 to 25% of a length W of one side of the two-dimensional code, the one side having the position where the distance is shortened to the shortest distance Lmin.

The one side of the two-dimensional code has a longest distance Lmax1 not greater than 50% of the length W from the ridge pattern region, the one side having the position where the distance from the ridge pattern region is shortened to the shortest distance Lmin.

Preferably, a longest distance Lmax2 at a position where the two-dimensional code has the distance from the ridge pattern region is maximized to the longest distance Lmax2 among the four sides of the rectangular shape of the two-dimensional code is not greater than 150% of the length W.

Preferably, the smooth surface of the smooth surface region provided with the two-dimensional code is positioned at a level higher than a valley in a valley depth direction from the ridge to the valley sandwiched between the ridges and not higher than a top of the ridge.

Preferably, a position of the smooth surface in the valley depth direction is at a level lower than the top by a length of 0 to 80% of a valley depth D from the top of the ridge to the valley.

Preferably, the smooth surface region has a rectangular shape and is surrounded by the ridge pattern region, and an aspect ratio of the rectangular shape is from 0.8 to 1.2.

Preferably, the smooth surface region is surrounded by the ridge pattern region, and an area of a region of the dot pattern is from 40% to 90% of an area of the smooth surface region.

Preferably, a distance H along the tire radial direction from an innermost position in the tire radial direction of a bead core of the pneumatic tire to a center position in the tire radial direction of the two-dimensional code is not greater than 70% of a cross-sectional height SH, as a cross-sectional height along the tire radial direction from the innermost position in the tire radial direction of the bead core to a position of a tire maximum outer diameter is referred to as the cross-sectional height SH.

Preferably, the two-dimensional code and the smooth surface are provided on each of the sidewall portions on both sides in the tire width direction of the pneumatic tire.

The pneumatic tire described above enables the initial readability to be improved compared with the two-dimensional code engraved on the ridge pattern region and enables the lowering of the readability of the two-dimensional code to be suppressed even when the tire is used long-term.

DETAILED DESCRIPTION

The pneumatic tire of the present embodiment will be described in detail below.

In the present specification, "tire width direction" is the direction parallel with the rotation axis of the pneumatic tire. "Outward in the tire width direction" is the direction in the tire width direction away from a tire equator line CL (refer to FIG. 1) that represents the tire equatorial plane. "Inward in the tire width direction" is the direction in the tire width direction toward the tire equator line CL. "Tire circumferential direction" is the direction of rotation of the pneumatic tire about the center of the rotation axis. "Tire radial direction" is the direction orthogonal to the rotation axis of the pneumatic tire. "Outward in the tire radial direction" refers to the direction away from the rotation axis. Additionally, "inward in the tire radial direction" refers to the direction toward the rotation axis.

"Cross-sectional height SH" and "Distance H" described later in the present specification refer to the dimensions measured in an unloaded state in which the tire is assembled on a specified rim and inflated to the specified internal pressure. Here, "specified rim" refers to an "applicable rim" defined by the Japan Automobile Tyre Manufacturers Association (JATMA), a "Design Rim" defined by the Tire and Rim Association (TRA), and a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO.

Further, in the embodiments described below, a two-dimensional code is engraved on the sidewall portion. The engraving referred to in the present embodiment includes an aspect in which a plurality of minute dot holes are formed on a surface by locally heating and burning a side rubber member by concentrating the laser beam and energy on the surface of the sidewall portion and includes also an aspect in which a two-dimensional code is formed by engraving unevenness on the side rubber member by another means.

The two-dimensional code according to the present embodiment is a code of a matrix display type having information in two directions, compared with one-dimensional code having information only in the lateral direction (bar code). The two-dimensional codes include, for example, QR code® (trade name), data matrix (trade name), Maxicode, PDF-417 (trade name), 16K code (trade name), 49 code (trade name), Aztec code (trade name), SP code (trade name), VeriCode® (trade name), and CP code (trade name).

Pneumatic Tire

Figure 1:
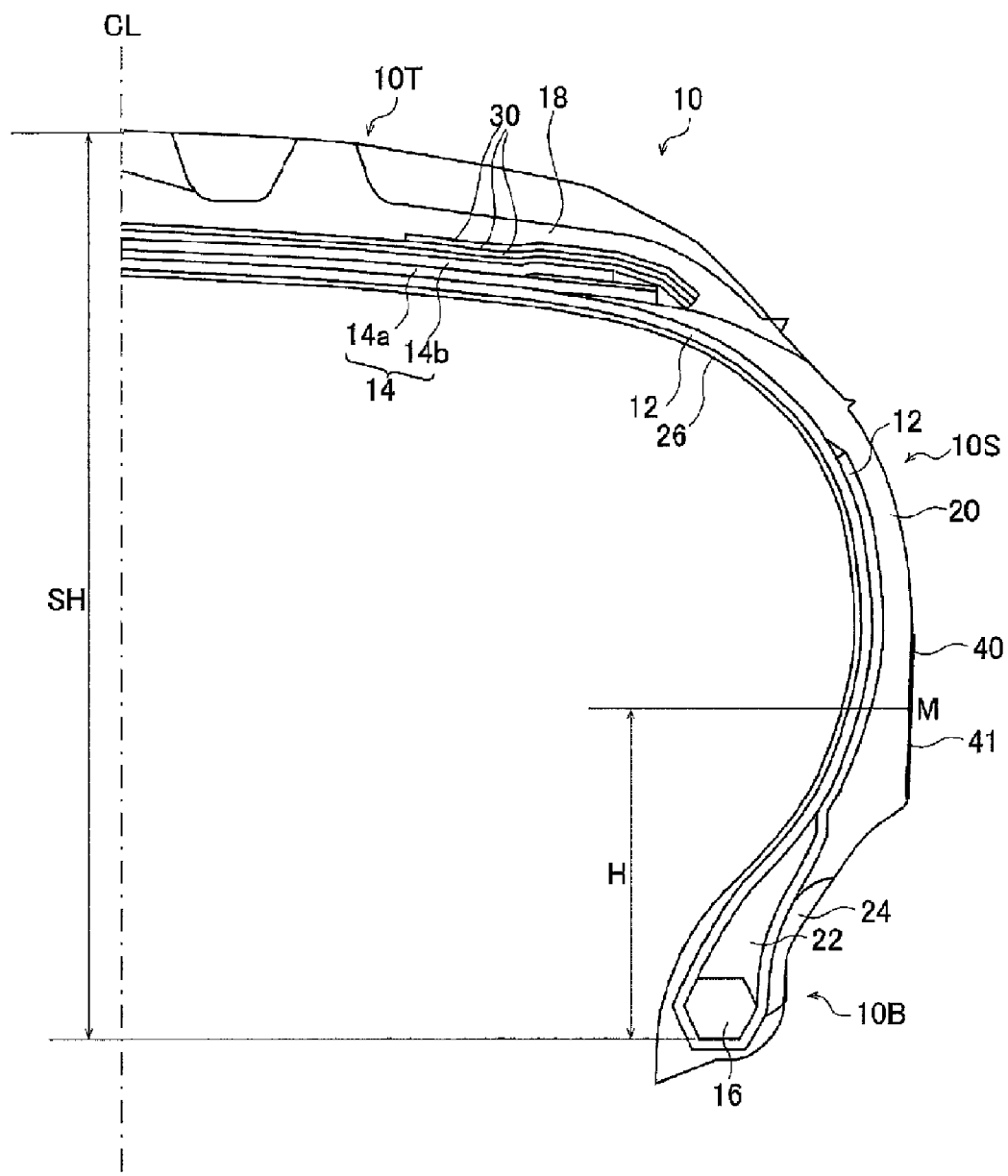
FIG. 1 is a view illustrating an example of a configuration of a pneumatic tire according to an embodiment.

FIG. 1 is a view illustrating an example of a configuration of a pneumatic tire 10 (hereinafter referred to simply as "tire 10") according to the present embodiment. FIG. 1 illustrates a profile cross section on one side in the tire width direction with respect to the tire equator line CL.

The tire 10 includes a tread portion 10T having a tread pattern, a pair of bead portions 10B provided on both sides in the tire width direction, and a pair of sidewall portions 10S which are provided on both sides of the tread portion 10T and which connect the pair of bead portions 10B and the tread portion 10T. The tread portion 10T is a portion in contact with a road surface. The sidewall portion 10S is a portion provided as if the tread portion 10T is sandwiched from both sides in the tire width direction. The bead portion 10B is a portion connected to the sidewall portion 10S and positioned inward in the tire radial direction with respect to the sidewall portion 10S.

The tire 10 mainly includes a carcass ply 12, a belt 14, and a bead core 16 as framework members, and a tread rubber member 18, a side rubber member 20, a bead filler rubber member 22, a rim cushion rubber member 24, and an innerliner rubber member 26 around the framework members.

The carcass ply 12 is composed of a carcass ply member that is made of organic fibers covered with rubber and that is wound between a pair of bead cores 16 having an annular shape and formed into a toroidal shape. The carcass ply 12 is wound around the bead core 16 and extends outward in the tire radial direction. The belt layer 14 is provided outward of the carcass ply 12 in the tire radial direction and includes two belt members 14a, 14b. The belt 14 is a member formed from steel cords covered with rubber, in which the steel cords are arranged inclined at a predetermined angle, for example, 20 to 30 degrees, with respect to the tire circumferential direction. The width in the tire width direction of the belt member 14a, which is a lower layer, is greater than the width in the tire width direction of the belt member 14b, which is an upper layer. The steel cords of the two belt members 14a, 14b are inclined in opposite directions for each belt member. As such, the belt members 14a, 14b are crossing layers serving to suppress the expansion of the carcass ply 12 due to the pressure of the air filled in the tire.

The tread rubber member 18 is provided outward of the belt 14 in the tire radial direction. Both end portions of the tread rubber member 18 connect to the side rubber member 20 to form the sidewall portion 10S. The rim cushion rubber member 24 is provided at ends inward of the side rubber member 20 in the tire radial direction and come into contact with a rim on which the tire 10 is mounted. The bead filler rubber member 22 is provided on the outward of the bead cores 16 in the tire radial direction and is interposed between a portion of the carcass ply 12 before it is wound around the bead core 16 and a portion of the carcass ply 12 after it is wound around the bead core 16. The innerliner rubber member 26 is provided on the inner surface of the tire 10 facing a tire cavity region that is filled with air and is surrounded by the tire 10 and the rim.

In addition, there is provided a three-layer belt cover 30 between the belt member 14b and the tread rubber member 18, which covers the belt 14 from the outward in the tire radial direction of the belt 14 and which is made of the organic fiber covered with rubber. The belt cover 30 may be provided as required and is not essential. The number of layers of the belt cover 30 is not limited to 3 and may be 1 or 2.

A two-dimensional code 40 is provided on the surface of the sidewall portion 10S of the tire 10.

Side Pattern

Figure 2:
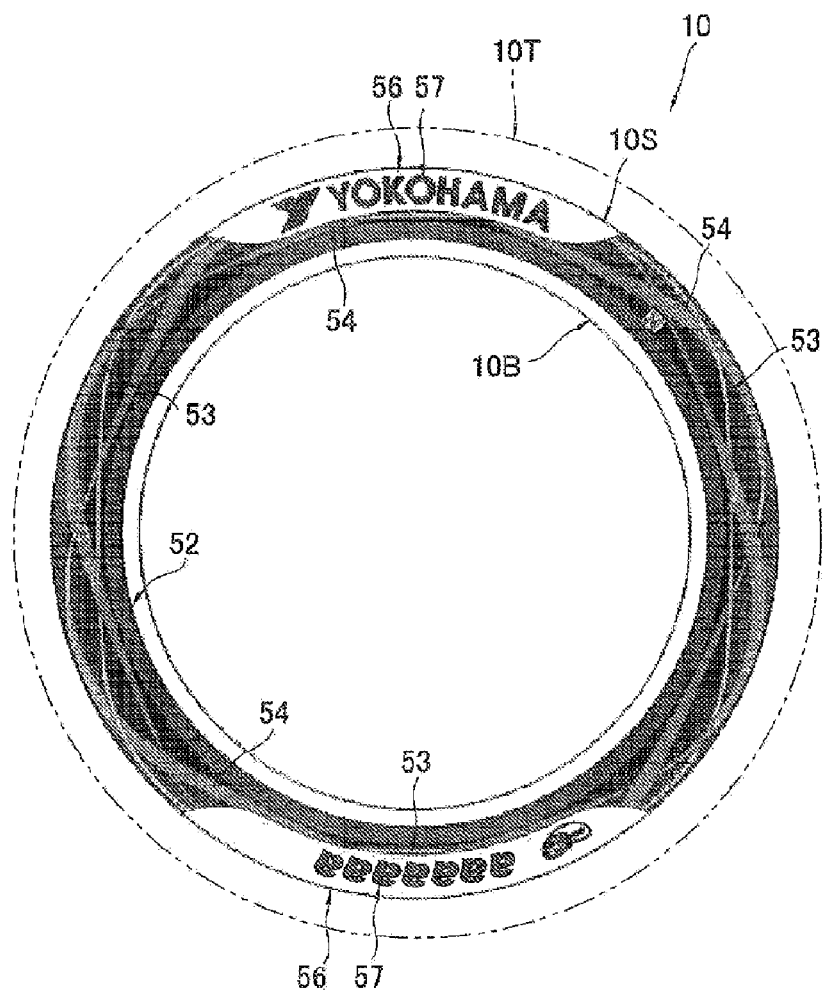
FIG. 2 is a view illustrating an example of a side pattern provided on a sidewall portion of a tire according to an embodiment.
Figure 3:
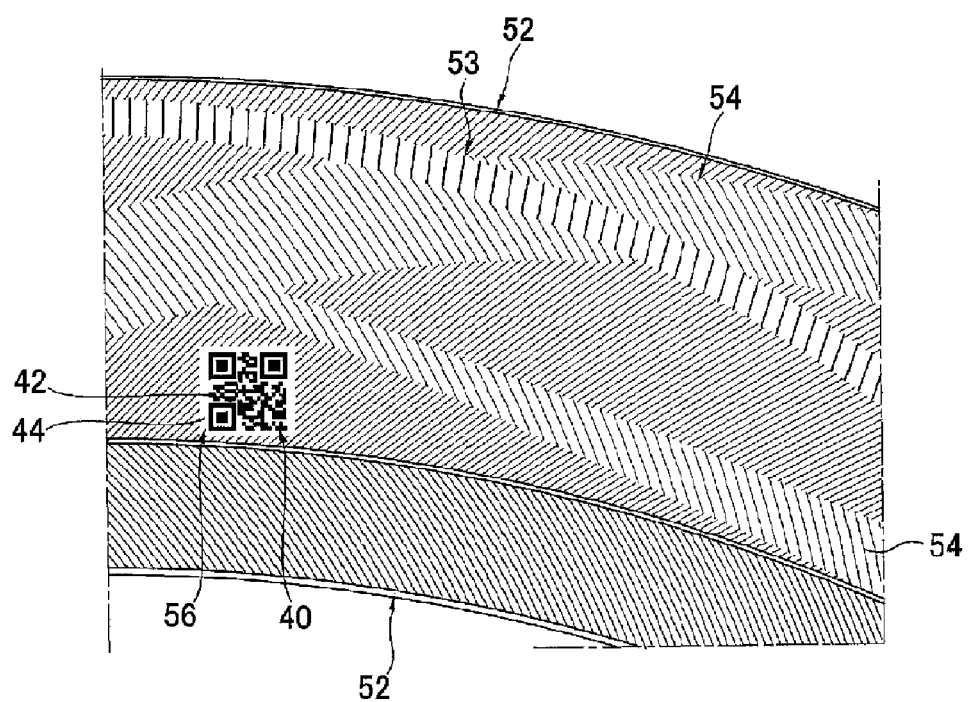
FIG. 3 is an enlarged view of a portion of the side pattern illustrated in FIG. 2.

FIG. 2 is a view illustrating an example of a side pattern provided on the sidewall portion 10S of the tire 10 according to an embodiment. FIG. 3 is an enlarged view of a portion of the side pattern as illustrated in FIG. 2.

As illustrated in FIG. 2, a side pattern is formed on the surface of the sidewall portion 10S. The side pattern mainly includes a ridge pattern region and a non-ridge pattern region.

The ridge pattern regions include a background ridge pattern region 52, a first band-like ridge region 53, a second band-like ridge region 54, and a marking display region 57. The non-ridge pattern region includes a smooth surface region 56.

The background ridge pattern region 52 is a region in which a plurality of ridges extending continuously in one direction are provided at a predetermined interval and functions as a background for making the first band-like ridge region 53 and the second band-like ridge region 54 conspicuous.

The first band-like ridge region 53 and the second band-like ridge region 54 are band-like regions in which a plurality of ridges extending continuously in one direction are provided at a predetermined interval, and these regions are displaced in the tire radial direction when moving along in the tire circumferential direction. This provides a pattern in which the band fluctuates like a wave on the sidewall portion 10S.

The background ridge pattern region 52, the first band-like ridge region 53 and the second band-like ridge region 54 differ in types of ridges so as to be visually distinguished from each other. "Differ in types of ridges" means that at least one of the valley depths between the valley bottom of adjacent ridges, the distance between the adjacent ridges, and the direction in which the ridges extend differs.

As illustrated in FIG. 3, the second band-like ridge region 54 is arranged so as to be divided into two or merged. In FIG. 3, ridges are represented by lines, and in the example illustrated in FIG. 3, the distance between adjacent ridges is the background ridge pattern region 52, the second band-like ridge region 54, and the first band-like ridge region 53 in ascending order, and the distance between ridges of the first band-like ridge region 53 is the largest. The extending directions of the ridges also differ from one another in the background pattern ridge region 52, the first band-like ridge region 53, and the second band-like ridge region 54.

The marking display region 57 is provided so as to be surrounded by the smooth surface region 56, and displays a marking as illustrated in FIG. 2. A plurality of ridges extending in one direction are provided inside the marking display region 57 so as to be distinguished from the smooth surface region 56.

The smooth surface region 56 does not include the ridges and forms the smooth surface. The smooth surface region 56 is provided adjoining the ridge pattern regions.

The two-dimensional code 40 is provided on such a side pattern.

Two-Dimensional Code

As illustrated in FIG. 3, the two-dimensional code 40 is engraved on the smooth surface region 56. The two-dimensional code 40 is formed on the surface of each of the side rubber members 20 of both sidewall portions 10S in the tire width direction. According to another embodiment, the two-dimensional code 40 is formed on the surface of the side rubber member 20 of either of the sidewall portions 10S.

The two-dimensional code 40 has a dot pattern formed by two types of gray scale elements which are formed so as to be distinguishable from each other by surface unevenness. The two-dimensional code 40 of the present embodiment is a pattern formed in such a way that a plurality of minute dot holes are engraved on a surface by locally heating and burning the side rubber member 20 by concentrating the laser beam and energy on the surface of the sidewall portion 10S. The dot hole is, for example, a conical hole, and the diameter on the tread surface is, for example, from 0.1 to 1.0 mm, and the depth is, for example, from 0.3 to 1.0 mm.

The two-dimensional code 40 is arranged by providing one dot hole (recess portion) in a unit cell region of a dark region among unit cells that separate the gray scale elements of the two-dimensional code. That is, the two-dimensional code 40 has a configuration in which the dot holes are arranged corresponding to the unit cell regions of the rectangular shape of the same size divided into a lattice shape. One dot hole is formed in one dark unit cell region of the gray scale element. In FIG. 3, a dark region of the unit cell region is represented by a black-filled region.

The two-dimensional code 40 illustrated in FIG. 3 is a QR code® (trade name) and includes a dot pattern region 42 in which a dot pattern is formed by two kinds of gray scale elements. Around the dot pattern region 42, that is, around the two-dimensional code 40, there is provided a blank region 44, which is surrounded by the same light elements as the light elements among the gray scale elements. The blank region 44 is a region defined as a quiet zone in the QR code® (trade name) and is a region necessary for reading out the QR code® (trade name). The thickness of the blank region 44 surrounding the dot pattern region 42 is preferably, for example, from 4 to 5 times the size of the unit cell region in the dot pattern region 42. For example, the thickness of the blank region 44 is preferably from 3% to 25% of the maximum dimension among two directions of the rectangular shape of the dot pattern region 42.

Since the two-dimensional code 40 illustrated in FIG. 3 is a QR code® (trade name), the dot pattern region 42 includes a data cell region displaying a data cell of the QR code® (trade name) and a cutout symbol region displaying a cutout symbol.

As described above, since the two-dimensional code 40 is engraved on the smooth surface region 56, the readability is improved as compared with the case where the two-dimensional code 40 is engraved on the ridge pattern region.

Figure 4:
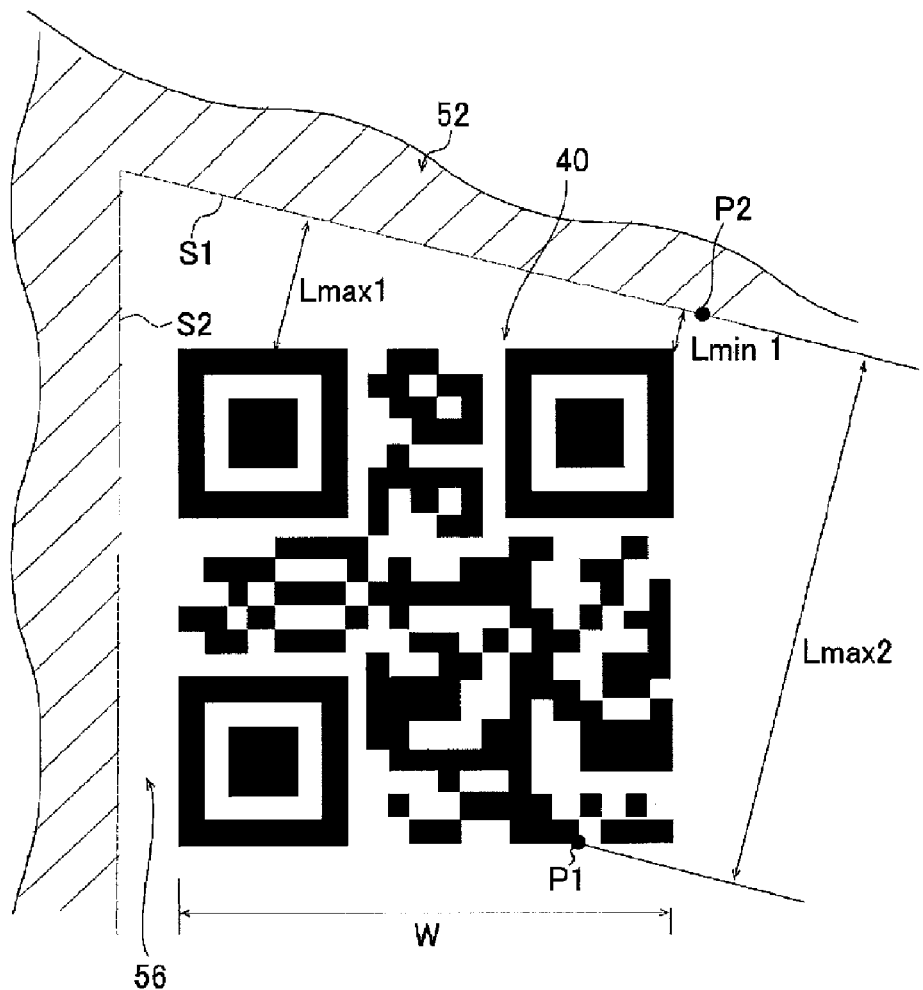
FIG. 4 is a view explaining a positional relationship between a two-dimensional code and a ridge pattern region in an embodiment different from FIG. 3.

FIG. 4 is a view explaining a positional relationship between the two-dimensional code 40 and the background ridge pattern region 52 that is the ridge pattern region, in one embodiment differing from FIG. 3. In FIG. 4, the boundary between the background ridge pattern region 52 and the smooth surface region 56 is represented by dotted lines S1 and S2 that do not actually exist. In the configuration illustrated in FIG. 4, the line S1 is inclined at an angle greater than 0 degree and less than 90 degrees with respect to the sides of the two-dimensional code 40, and the line S2 is parallel with or perpendicular to each side. As illustrated in FIG. 4, among the four sides of the rectangular shape of the two-dimensional code 40, a shortest distance Lmin at a position where the two-dimensional code 40 has the distance from the background ridge pattern region 52 (ridge pattern region) shortened to the shortest distance Lmin is from 3 to 25% of a length W of a side of the four sides of the two-dimensional code 40. In the configuration of the two-dimensional code 40 and the smooth surface region 42 illustrated in FIG. 3, each side of the two-dimensional code 40 is parallel with or perpendicular to the straight line of the boundary between the smooth surface region 56 and the background ridge pattern region 52, so the distance is kept the shortest distance Lmin at any position of the one side having the distance shortened to the shortest distance Lmin.

The reason the upper limit of the shortest distance Lmin is set to 25% of the length W is to cause the two-dimensional code 40 to be positioned in a smooth surface region at or near the ridge pattern region. A vulcanization failure hardly occurs in a region where the two-dimensional code 40 satisfying such conditions is provided. The vulcanization failure includes, in addition to the strong vulcanization failure in which the tire is discarded as a rejected tire, a slight vulcanization failure in which the tire is specified by inspection and revised to be a qualified tire and an extremely slight vulcanization failure which cannot be specified by inspection. However, the above-described vulcanization failure does not occur in the ridge pattern region such as the background ridge pattern region 52. Accordingly, these vulcanization failures hardly occur even in the smooth surface region at or near the ridge pattern region. Thus, it is preferable from the viewpoint of the durability of the tire to engrave the two-dimensional code 40 on a smooth surface region where vulcanization failure hardly occurs. Further, since the two-dimensional code 40 is engraved on the smooth surface region at or near the ridge pattern region where the slight or extremely slight vulcanization failure hardly occurs, cracks are hardly generated and hardly developed from the dot holes by long-term use of the tire. Thus, the lowering of readability, due to the difficulty in identifying the gray scale elements of the two-dimensional code 40 by the surface irregularity formed on the surface of the two-dimensional code 40 accompanying the occurrence of cracks, can be prevented. That is, the lowering of the readability of the two-dimensional code 40 due to the long-term use of the tire less happens, and the lowering of the durability of the tire is also suppressed. Further, since the two-dimensional code 40 is engraved on the smooth surface region, readability at the initial stage of tire use is improved compared with the two-dimensional code 40 engraved on the ridge pattern region.

On the other hand, the reason the lower limit of the shortest distance Lmin is set to 3% of the length W is to ensure the blank region 44 necessary for reading the two-dimensional code 40 in the smooth surface region 56. By providing the blank region 44 composed of light elements among the gray scale elements in the smooth surface region, readability is improved as compared with the case of providing the blank region 44 in the ridge pattern region. Here, in the example illustrated in FIG. 4, the distance between one side of the two-dimensional code 40 and the ridge pattern region refers to the shorter dimension of the distances between each position of the one side and the straight line S1; and between each position and the straight line S2, considering that the boundary between the ridge pattern region and the smooth surface region 56 includes the straight line S1 and the straight line S2. The shortest distance among the distances at each position on one side is the shortest distance Lmin.

According to an embodiment, a longest distance Lmax1 from the ridge pattern region of one side of the two-dimensional code 40 having a position at which the distance from the ridge pattern region is the shortest distance Lmin is preferably not greater than 50% of the length W of the one side. By specifying the upper limit of the longest distance Lmax1, it is possible to reliably provide the two-dimensional code 40 in a region where a vulcanization failure (including slight or extremely slight vulcanization failure) hardly occurs, without positioning a side of the two-dimensional code 40 having the shortest distance Lmin too much away from the vicinity of the ridge pattern region. Here, the longest distance Lmax1 is the longest distance among the distances at each position on the one side. In the configuration of the two-dimensional code 40 and the smooth surface region 56 illustrated in FIG. 3, Lmax1=Lmin1.

According to an embodiment, a longest distance Lmax2, which is the longest distance from the ridge pattern region at the position where the distance from the ridge pattern region is longest among the four sides of the rectangular shape of the two-dimensional code 40, is preferably not greater than 150% of the length W of the one side. In the example illustrated in FIG. 4, the distance between the point P2 on the line S1 and the point P1 on one side of the two-dimensional code 40 corresponds to the farthest distance from the lines S1 and S2 among the four sides of the two-dimensional code 40. Thus, by setting the longest distance Lmax2 farthest from the ridge pattern region in the two-dimensional code 40 to not greater than 150% of the length W, the two-dimensional code 40 can be reliably provided in a region where vulcanization failure (including slight or extremely slight vulcanization failure) hardly occurs. In this case, in order to secure the blank region 44 in the smooth surface region 56, the longest distance Lmax2 is preferably not less than 103% of the length W.

Figure 5:
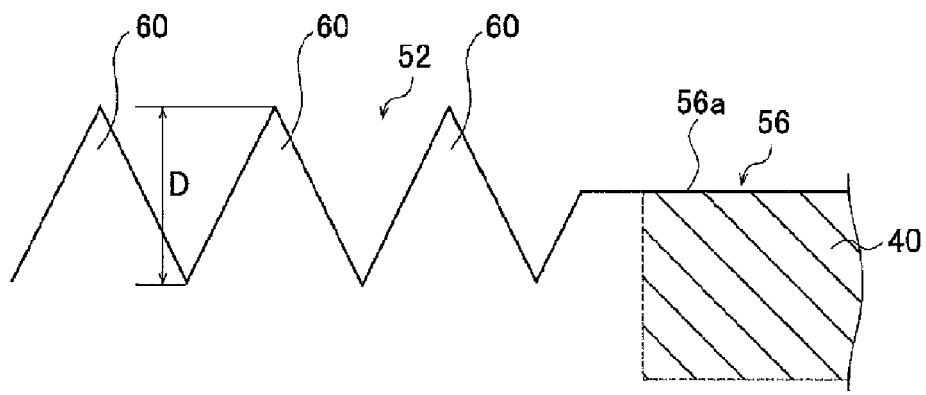
FIG. 5 is a view explaining a positional relationship between a smooth surface of a smooth surface region and a ridge of a ridge pattern region in an embodiment.

According to an embodiment, the smooth surface of the smooth surface region 56 provided with the two-dimensional code 40 is higher than the valley in the valley depth direction of the valley sandwiched between the ridges in the ridge pattern region and is preferably at a level position not higher than the top of the ridge. FIG. 5 is a view explaining the level positional relationship between the ridge of the ridge pattern region and the smooth surface of the smooth surface region 56. In FIG. 5, the smooth surface region 56 in which the two-dimensional code 40 having dot holes is formed is illustrated by oblique lines.

In the example illustrated in FIG. 5, a smooth surface 56a is at a level position lower than the top of a ridge 60 in the valley depth direction (in FIG. 5, the vertical direction), but the smooth surface 56a may be at a level position the same as the top of the ridge 60. By setting the level position of the smooth surface 56a in this manner, a vulcanization failure on the smooth surface 56a is less likely to occur further. Thus, even when the tire 10 is used for a long term with a two-dimensional code engraved in the smooth surface 56a, the lowering of readability caused by the occurrence of cracks is small. In particular, the level position in the valley depth direction of the smooth surface 56a is preferably at a level position lower than the top by a length of 0 to 80% of a valley depth D (refer to FIG. 5) from the top to the valley of the ridge 60.

According to an embodiment, the smooth surface region 56 is preferably rectangular in shape, the smooth surface region 56 is surrounded by the ridge pattern region, and the aspect ratio of the rectangular shape of the smooth surface region 56 is preferably from 0.8 to 1.2. For example, the smooth surface region 56 having a rectangular shape can be formed so as to be surrounded by the background ridge pattern region 52. In this case, the aspect ratio of the rectangular shape of the smooth surface region 56 is preferably set to from 0.8 to 1.2 in accordance with the size of the rectangular shape of the two-dimensional code 40. Since the smooth surface region 56 can be provided corresponding to the shape of the two-dimensional code 40 having, for example, a square shape, an extra portion can be prevented from being provided in the smooth surface region 56, and the occurrence of vulcanization failure can be suppressed.

According to an embodiment, when the smooth surface region 56 is surrounded by the ridge pattern region, the area of the dot pattern region 42 of the two-dimensional code 40 is preferably from 40% to 90% of the area of the smooth surface region 56. Accordingly, the two-dimensional code 40 is engraved on the smooth surface region 56, close to the ridge pattern region, in which vulcanization failure hardly occurs, thus it is preferable from the viewpoint of providing the tire durability. Further, since the two-dimensional code 40 is engraved on the smooth surface region 56 at or near the ridge pattern region where the slight or extremely slight vulcanization failure hardly occurs, cracks are hardly generated and hardly developed from the dot holes by long-term use of the tire. Thus, the lowering of readability, due to the difficulty in identifying the gray scale elements of the two-dimensional code 40 by the surface irregularity formed on the surface of the two-dimensional code 40 accompanying the occurrence of cracks, can be prevented. When the region of the smooth surface region 56 is less than 40%, the size of the two-dimensional code 40 is small, which is undesirable in terms of readability. On the other hand, when the area of the dot pattern region 42 is more than 90%, the blank region 44 cannot be secured, and the readability is lowered.

According to one embodiment, the distance H (refer to FIG. 1) along the tire radial direction from the innermost position in the tire radial direction of the bead core 16 illustrated in FIG. 1 to a center position M (refer to FIG. 1) of the two-dimensional code 40 in the tire radial direction is preferably not greater than 70% of the cross-sectional height SH (refer to FIG. 1) of the tire 10. Here, "the cross-sectional height SH" refers to a distance along the tire radial direction from the innermost position in the tire radial direction of the bead core 16 of the tire 10 to the position of the tire maximum outer diameter. When the smooth surface region 56 is provided in a region where the distance H exceeds 70% of the cross-sectional height SH, a vulcanization failure in the smooth surface region 56 is likely to occur, which is not preferable. In particular, the distance H is preferably not greater than 40% of the cross-sectional height SH from the viewpoint of suppressing the occurrence of cracks in the dot holes and suppressing the progress of the generated cracks.

The two-dimensional code 40 and the smooth surface region 56 are preferably provided on each of the sidewall portions 10S on both sides in the tire width direction of the tire 10. Even when the tire 10 is mounted on the vehicle, the two-dimensional code 40 engraved on the sidewall portion 10S on one side can be surely read out.

EXAMPLE, COMPARATIVE EXAMPLE

In order to confirm the effect of the tire 10, a tire in which the two-dimensional code 40, specifically, a QR code® (trade name) is engraved on the sidewall portion 10S was manufactured. After the tire was irradiated with ozone concentration of 100 pphm, indoor drum running (speed 120 km/h) was performed for 1.5 hours by a low-pressure test (XL: Air pressure 160 kPa, load 100% LI) in accordance with FMVSS (Federal Motor Vehicle Safety Standards) 139, while the tire was irradiated with ozone at predetermined time intervals. This test reproduces the deterioration of the tire due to long-term use of the tire.

For each of the examples and the comparative examples, ten tires provided with the two-dimensional code 40 were prepared and tested.

When the two-dimensional code 40 is read out by a two-dimensional code reader, by irradiating the two-dimensional code 40 with predetermined illumination light from a predetermined direction, the result of reading out was evaluated as follows: the case where for all 10 tires, reading out was done without any problem was designated as Evaluation A; the case where for all 10 tires, reading out was done, but for 1 to 2 tires, reading out was done after the irradiation method of illumination light is changed was designated as Evaluation B; the case where for 3 to 4 tires, reading out was done after the irradiation method of illumination light is changed was designated as Evaluation C; the case where for 5 to 6 tires, reading out was done after the irradiation method of illumination light is changed was designated as Evaluation D; the case where for 7 to 10 tires, reading out was done after the irradiation method of illumination light is changed was designated as Evaluation E; and the case where for at least one of the 10 tires, reading out could not be done was designated as Evaluation F. Evaluations A to E are pass, and evaluation F is fail.

The specifications and evaluation results are shown in Tables 1 and 2 below.

In the following Tables 1 and 2, a QR code® (trade name) having a dot hole depth of 1.5 mm and a unit cell length of 0.6 mm for separating the gray scale elements was engraved as the two-dimensional code 40. The distance between the top portions of the adjacent ridges was 0.8 mm, and the valley depth from the top of the ridge to the valley was 0.8 mm The two-dimensional code 40 was engraved on the background ridge pattern region 52 or the fabricated smooth surface region 56.

"Position of the smooth surface in the valley depth direction" in Tables 1 and 2 indicates what percentages in the position of the valley depth D the smooth surface 56a is lower than the top, and the "−10%" in example 4 means that the smooth surface 56a projects 10% of the valley depth D from the top of the ridge.

TABLE 1

|  | Comparative Example 1 | Comparative Example 2 | Example 1 | Example 2 | Example 3 |
|---|---|---|---|---|---|
| Engraving position of two-dimensional code | Smooth surface region | Smooth surface region | Smooth surface region | Smooth surface region | Smooth surface region |
| Lmin/W | 1% | 27% | 3% | 14% | 25% |
| Position of smooth surface in the valley depth direction | 40% | 40% | 40% | 40% | 40% |
| Readability | D | E | B | A | B |

TABLE 2

|  | Example 4 | Example 5 | Example 6 | Example 7 |
|---|---|---|---|---|
| Engraving position of two-dimensional code | Smooth surface region | Smooth surface region | Smooth surface region | Smooth surface region |
| Lmin/W | 14% | 14% | 14% | 14% |
| Position of smooth surface in the valley depth direction | −10% | 80% | 90% | 0% |
| Readability | C | B | C | B |

From Comparative Examples 1 and 2 and Examples 1 to 3 in Table 1, it can be seen that the lowering of readability accompanying long-term use of the tire can be suppressed by making the shortest distance Lmin from 3% to 25% of the length W.

Further, from the comparison of Examples 4 to 7, it is understood that the position of the smooth surface 56a in the valley depth direction is preferably at a lower position than the top by a length of 0 to 80% of the valley depth.

While the pneumatic tire according to the embodiments of the present technology is described above in detail, the present technology is not limited to the above embodiments and may be improved or modified in various ways within a range without departing from the spirit of the present technology as a matter of course.

The invention claimed is:

1. A pneumatic tire, comprising
a pair of sidewall portions that sandwich a tread portion from both sides in a tire width direction, the tread portion extending in a tire circumferential direction and forming an annular shape,
on a surface of at least one of the pair of sidewall portions, the pneumatic tire comprising:
a ridge pattern region provided with a plurality of ridges extending continuously in one direction at an interval;
a smooth surface region adjoining the ridge pattern region and having no ridge and composed of a smooth, flat surface;
a two-dimensional code having a rectangular shape in which a dot pattern is formed of two kinds of gray scale elements that are formed distinguishable from each other by unevenness of a surface, and
end portions of the ridges directly intersect the smooth surface and are discrete and disconnected from one another,
the two-dimensional code being provided in the smooth surface region,
a shortest distance Lmin at a position where the two-dimensional code has a distance from the ridge pattern region shortened to the shortest distance Lmin among four sides of the rectangular shape of the two-dimensional code being from 3 to 25% of a length W of one side of the two-dimensional code, the one side having the position where the distance is shortened to the shortest distance Lmin,
the smooth surface of the smooth surface region provided with the two-dimensional code being positioned at a level higher than a valley in a valley depth direction from a ridge of the ridges to the valley sandwiched between the ridges and not higher than a top of the ridge,
cross sectional shapes of the top and the valley on a cross section perpendicular to an extending direction of the ridge of the ridges being symmetrical with respect to a line passing through a center in the valley depth direction between the top and the valley, the top and the valley being offset in a direction that the ridges are provided at the interval, and
a position of the smooth surface in the valley depth direction being at a level lower than the top by a length of 80% to 90% of a valley depth D from the top of the ridge to the valley.

2. The pneumatic tire according to claim 1, wherein the one side of the two-dimensional code has a longest distance Lmax1 not greater than 50% of the length W from the ridge pattern region, the one side having the position where the distance from the ridge pattern region is shortened to the shortest distance Lmin.

3. The pneumatic tire according to claim 2, wherein a longest distance Lmax2 at a position where the two-dimensional code has the distance from the ridge pattern region maximized to the longest distance Lmax2 among the four sides of the rectangular shape of the two-dimensional code is not greater than 150% of the length W.

4. The pneumatic tire according to claim 3, wherein the smooth surface region has a rectangular shape and is surrounded by the ridge pattern region, and an aspect ratio of the rectangular shape of the smooth surface region is from 1.05 to 1.2.

5. The pneumatic tire according to claim 4, wherein the smooth surface region is surrounded by the ridge pattern region, and an area of a region of the dot pattern is from 40% to 90% of an area of the smooth surface region.

6. The pneumatic tire according to claim 2, wherein the longest distance Lmax1 differs from the shortest distance Lmin.

7. The pneumatic tire according to claim 1, wherein a longest distance Lmax2 at a position where the two-dimensional code has the distance from the ridge pattern region maximized to the longest distance Lmax2 among the four sides of the rectangular shape of the two-dimensional code is not greater than 150% of the length W.

8. The pneumatic tire according to claim 1, wherein the smooth surface region has a rectangular shape and is surrounded by the ridge pattern region, and an aspect ratio of the rectangular shape of the smooth surface region is from 0.8 to 0.95.

9. The pneumatic tire according to claim 1, wherein the smooth surface region is surrounded by the ridge pattern region, and an area a region of the dot pattern is from 40% to 90% of an area of the smooth surface region.

10. The pneumatic tire according to claim 1, wherein
a distance H along the tire radial direction from an innermost position in the tire radial direction of a bead core of the pneumatic tire to a center position in the tire radial direction of the two-dimensional code is not greater than 70% of a cross-sectional height SH, as a cross-sectional height along the tire radial direction from the innermost position in the tire radial direction of the bead core to a position of a tire maximum outer diameter is referred to as the cross-sectional height SH.

11. The pneumatic tire according to claim 1, wherein the two-dimensional code and the smooth surface are provided on each of the sidewall portions on both sides in the tire width direction of the pneumatic tire.

12. The pneumatic tire according to claim 1, wherein the shortest distance Lmin among four sides of the rectangular shape of the two-dimensional code is 14% of the length W.

13. The pneumatic tire according to claim 1, wherein
a dot hole of the dot pattern has a depth from 1.0 mm to 1.5 mm, and
the ridge of the ridges has a valley depth from a top of the ridge to a valley of 0.8 mm.

\* \* \* \* \*